(12) United States Patent
Coleman et al.

(10) Patent No.: US 10,348,516 B2
(45) Date of Patent: Jul. 9, 2019

(54) ON-PREMISE AND OFF-PREMISE COMMUNICATION

(71) Applicant: INTERNATIONAL BUSINESS MACHINES CORPORATION, Armonk, NY (US)

(72) Inventors: Andrew Coleman, Vestal, NY (US); Matthew E. Golby-Kirk, Hampshire (GB); John A. Reeve, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 15/186,968

(22) Filed: Jun. 20, 2016

(65) Prior Publication Data

US 2017/0264460 A1 Sep. 14, 2017

(30) Foreign Application Priority Data

Mar. 9, 2016 (GB) .................................. 1604070.1

(51) Int. Cl.
*G06F 15/16* (2006.01)
*H04L 12/46* (2006.01)
*H04L 29/06* (2006.01)

(52) U.S. Cl.
CPC ...... *H04L 12/4633* (2013.01); *H04L 65/1066* (2013.01); *H04L 65/1069* (2013.01)

(58) Field of Classification Search
CPC ............. H04L 12/4633; H04L 65/1069; H04L 65/1066
USPC .................................. 709/202–203, 227–228
See application file for complete search history.

(56) References Cited

U.S. PATENT DOCUMENTS

| 7,675,914 B2 * | 3/2010 | Hamamoto ........... H04L 61/255 709/225 |
| 8,131,828 B2 * | 3/2012 | Lin ..................... H04L 12/1818 709/229 |
| 9,137,220 B2 | 9/2015 | Crosbie et al. |
| 9,251,114 B1 | 2/2016 | Ancin et al. |

(Continued)

FOREIGN PATENT DOCUMENTS

| CN | 104281506 A | 1/2015 |
| EP | 2947569 A1 | 11/2015 |

OTHER PUBLICATIONS

"ownCloud and IBM: Enabling secure and agile file sharing across the enterprise", IBM Systems Solution Brief. Retrieved from the Internet: <URL: https://owncloud.com/wp-content/uploads/2015/06/DS-IBM-ownCloud-Joint-Solution-Brief.pdf>, IBM Corporation 2015, 6 pgs.

(Continued)

*Primary Examiner* — Bharat Barot
(74) *Attorney, Agent, or Firm* — Brian Restauro; Matthew M. Hulihan; Heslin, Rothenberg Farley & Mesiti PC

(57) ABSTRACT

Proposed are concepts for managing communication between off-premise and on-premise servers. A flow execution request from an application of an off-premise server or an on-premise server is received and a requested flow is determined based on the received flow execution request. Stored endpoint data associated with the requested flow can then be identified. The flow execution request is then communicated to an on-premise server or off-premise server based on the identified endpoint data.

20 Claims, 9 Drawing Sheets

(56) References Cited

U.S. PATENT DOCUMENTS

| | | | |
|---|---|---|---|
| 9,479,567 B1* | 10/2016 | Koorapati | H04L 67/104 |
| 9,866,599 B2* | 1/2018 | Boneh | H04L 65/1069 |
| 9,917,912 B2* | 3/2018 | Almond | H04L 67/26 |
| 10,148,500 B2* | 12/2018 | Marino | H04L 12/4641 |
| 10,180,947 B2 | 1/2019 | Malhotra et al. | |
| 10,210,172 B1 | 2/2019 | Konig et al. | |
| 2003/0115218 A1 | 6/2003 | Bobbitt et al. | |
| 2008/0288609 A1 | 11/2008 | Pramberger | |
| 2010/0088414 A1* | 4/2010 | Lin | H04L 12/1818 709/227 |
| 2010/0154038 A1 | 6/2010 | Natarajan | |
| 2011/0258333 A1 | 10/2011 | Pomerantz et al. | |
| 2014/0040196 A1 | 2/2014 | Wijayaratne et al. | |
| 2014/0108665 A1 | 4/2014 | Arora et al. | |
| 2014/0244791 A1 | 8/2014 | Fellows et al. | |
| 2015/0127937 A1 | 5/2015 | Ali et al. | |
| 2015/0188779 A1 | 7/2015 | McCanne et al. | |
| 2015/0373103 A1* | 12/2015 | Tessier | H04L 67/1095 709/203 |
| 2016/0212120 A1 | 7/2016 | Bryant et al. | |
| 2016/0283512 A1 | 9/2016 | Beale | |
| 2016/0323358 A1 | 11/2016 | Malhotra et al. | |
| 2017/0034267 A1 | 2/2017 | Nagasubramaniam et al. | |
| 2017/0093955 A1* | 3/2017 | Evans | H04L 67/14 |
| 2017/0124170 A1 | 5/2017 | Koorapati et al. | |
| 2017/0180184 A1* | 6/2017 | Korotkov | H04L 12/4633 |
| 2017/0249328 A1 | 8/2017 | Liang et al. | |
| 2017/0300706 A1 | 10/2017 | Jassal et al. | |

OTHER PUBLICATIONS

Mell, Peter, et al., "The NIST Definition of Cloud Computing", NIST Special Publication 800-145, Sep. 2011, Gaithersburg, MD, 7 pgs.

List of IBM Patents or Applications Treated as Related, Dec. 16, 2016, pp. 1-2.

"On-Premises and Off-Premises Communication", U.S. Appl. No. 15/340,034, filed Nov. 1, 2016, pp. 1-45.

International Search Report/Written Opinion for PCT/IB2017/056750 dated Jan. 17, 2018, 11 pgs.

* cited by examiner

ON-PREMISE AND OFF-PREMISE COMMUNICATION

FIELD OF THE INVENTION

The present invention relates to communicating between on-premise and off-premise platforms.

The present invention further relates to a computer program product comprising computer-readable program code that enables a processor of a processing system to implement such a method.

The present invention yet further relates to a connectivity component (such as a switch component for example) adapted to implement such a method.

BACKGROUND

Communication between on-premise and off-premise platforms is required in a Software as a Service (SaaS) environment. SaaS is a software licensing and delivery model in which software is licensed on a subscription basis and is centrally hosted by an off-premise platform (such as a shared computing resource or a cloud computing resource accessible via the Internet for example). SaaS is typically accessed by users of an on-premise platform (for example, using a thin client via a web browser).

On-premise platforms are well-established and considered to provide a good level of security because data is stored and handled internally, e.g., within an internal private network.

Off-premise platforms (such as cloud computing resources) are a relatively recent and evolving concept. Generally, reference to off-premise resources or platforms is taken to refer to a concept for enabling ubiquitous, convenient, and on-demand access via Internet to shared pools of configurable off-premise (e.g. remotely located) computing resources such as networks, servers, storages, applications, functionalities, and the like which are accessible via the Internet. Conversely, reference to on-premise resources or platforms is taken to refer to a concept of local or private computing resources such as networks, servers, storage devices, application, etc. that are situated locally or within/behind a virtual boundary (often behind a firewall).

Due to the required communication between on-premise and off-premise platforms in a SaaS environment, data flows in a SaaS environment frequently need to integrate with systems of record within a datacenter behind a firewall. Typically, this is done either by using Virtual Private Network (VPN) technology, or by setting up a mutually authenticated Transport Layer Security (TLS) connection mapping the ports between the off-premise system (e.g. cloud-based service) and on-premise system (e.g. internal private network) in order to access the systems of record directly. These often lead to an excessive amount of network traffic and latency caused by the off-premise system making many calls to the on-premise system during the course of a single transaction.

Secure gateways exist that allow ports in the SaaS system to be mapped to on-premise ports, thereby allowing systems of record to be directly available to the SaaS. They are typically implemented as a mutually authenticated TLS connection, wherein the initial connection is made by an on-premise client program connecting out through a firewall to an off-premise server process running in the SaaS environment. This allows a connection to be established without having to explicitly open ports in the firewall. Port mapping software is then used to re-direct requests to systems of record from the SaaS back to the on-premise systems where the data is stored.

However, the drawback of this known approach is that the software running in the SaaS environment might make many calls to the on-premise systems of record, leading to excessively large amounts of data transfer in order to achieve the required tasks. This causes significant associated I/O performance bottlenecks. There are also security concerns with this approach because the software running in the SaaS environment has to have access to the security credentials in order to connect to the on-premise systems of record.

SUMMARY

The present invention seeks to provide a component for managing communication between off-premise and on-premise platforms that can reduce the amount of information exchanged between the platforms.

The present invention further seeks to provide a computer program product including computer program code for implementing the proposed communication concepts when executed on a processor.

The present invention yet further seeks to provide a network component (such as a connectivity component) adapted to execute this computer program code.

According to an embodiment of the present invention there is provided a connectivity component adapted to manage communication between off-premise and on-premise servers; the connectivity component comprising: an endpoint data store adapted to store endpoint data associated with one or more flows; a first communication component adapted to receive a flow execution request from an application of an off-premise server or an on-premise server; a routing component adapted to determine a requested flow based on the received flow execution request and to identify stored endpoint data associated with the requested flow; and a second communication component adapted to communicate the flow execution request to an on-premise server or off-premise server based on the identified endpoint data.

Proposed is a concept of breaking the parts of a main data flow that require access to the on-premise systems of record into flows or 'sub-flows', which is then run in an integration container in the on-premise environment. Only minimal amounts of information may then be required to invoke a flow from the main flow in the off-premise resource (e.g. cloud server). This may therefore minimize data exchange requirements. In particular, it may help to reduce network traffic over the Internet and also provide the security benefit of not needing to pass any systems of records credentials to off-premise parts.

Thus, there is described a system which may allow data processing flows to be split into a set of flows which can be configured to run either in the off-premise (e.g. cloud) environment, or on-premise environment. Flows may then be able to invoke each other and exchange data in an optimal manner. For example, the flows may be separated such that the ones which require access to on-premise systems of record run in the on-premise servers, and ones that would benefit from off-loading their computational intensive processing run in the off-premise infrastructure. A connectivity component, such as a switch component, is thus proposed which may manage communication between the off-premise and on-premise systems by receiving a flow execution request from an off-premise server and then communicating the request to an on-premise server based on identified endpoint data. Such endpoint data may be identified by the connectivity component using a data store which is adapted to store endpoint data associated with on-premise flows.

Proposed concepts may avoid mapping of ports between the off-premise system (e.g. SaaS environment) and the on-premise system. Instead, embodiments may be configured to only exchange data between the flow endpoints running in each environment. This may provide the performance benefit of reducing an amount of network traffic over the internet. It may also avoid having to expose credentials to off-premise parts.

In some environments, the first communication component of the connectivity component may be adapted to establish a secure tunnel for receiving the flow execution request. Similarly, the second communication component may be adapted to establish a secure tunnel communicating the flow execution request. For example, a mutually authenticated TLS tunnel connection may be to transfer data between the two environments. Secure communications between off-premise and on-premise platforms may therefore be provided.

In an embodiment, the connectivity component may further comprise a registration module adapted to receive end-point data from at least one of: an application of an off-premise server; an application of an on-premise server; an off-premise server module; and an on-premise server module. The registration module may then be adapted to store received endpoint data in the endpoint data store. Embodiments may therefore employ the concept of registering information about accessing or making use of a flow with the connectivity component so that the connectivity component can identify how to handle (e.g. where to communicate) a request for said flow. By using such a registration concept, a data store of endpoint data may be dynamically updated or maintained to reflect changes in available flows or severs.

For example, the registration module may be adapted to remove endpoint data from the data store in response to at least one of: an application; a server; and a flow becoming inaccessible (e.g. being disconnected, terminated, or powered-down). Proposed concepts may therefore be thought of as providing a dynamically updated store of endpoint information representing data flows that may be accessible and how (e.g. flow name and server location/address). Embodiments may therefore provide a connectivity component which can adapt to implementation specifics and cater for changes in available resources (e.g. applications, service and/or flows), thereby providing a high degree of flexibility and adaptability.

By way of example, the endpoint data may comprise at least one of: a flow name; a server identification; a server address; a flow version identifier; and checksum information. Endpoint data may, for instance, comprise information relating to the identity of a flow. Such identification information may then be used to match a flow request to a system running the required flow. Alternatively, or additionally, endpoint data may include information relating to a version or checksum in order to enable more complex matching. Endpoint data For example, the requester could provide a conditional call/request that calls/requests a flow named "flow1" which is at least at level 3 or higher. Similarly, the requester could ask to run flow named "flow2" that has a check sum of 22983098923 so that it could ensure it was calling a flow that had the correct code associated with it.

Endpoint data may comprise information to identify a system that a flow is running on. This may be purely used as operational information so an administrator can see what systems are offering particular flows. However, it may also be used for additional levels of security where only certain systems are allowed to register. Thus, endpoint data may be thought of as comprising information relating to the location of (i) a flow or (ii) a resource for executing a flow.

In an embodiment, the off-premise server may comprise a cloud sever, and the application may comprise a cloud application of the cloud server. Embodiments may therefore be employed in a SaaS environment for the provision of cloud-based services over the internet for example.

By way of example, the flow execution request may comprise at least one of: a flow name; a data payload; and entry point data. The flow execution request may therefore comprise information relating to the flow, data to be processed by the flow, and/or and entry point in the flow that the request would be made to. A flow execution request may thus comprise an identification portion and a payload portion. Inclusion of entry point data in a flow execution request may enable specification of an entry point in flow that the request is made to. For example, a flow called "flow1" could have two entry points called "entry1" and "entry2". The flow execution request may then include the flow name and the entry point within the flow, such as "flow1/entry1" for example. If no entry point information is employed, a default entry point may be used.

In embodiments, the first communication component may be adapted to receive a flow execution request from an off-premise server, and the second communication component may be adapted to communicate the flow execution request to an on-premise server based on the identified endpoint data. In this way, requests may be received from off-premise resources and routed by the connectivity component to the appropriate on-premise resource(s).

Alternatively, or additionally, the first communication component may be adapted to receive a flow execution request from an on-premise server, and the second communication component may be adapted to communicate the flow execution request to an off-premise server based on the identified endpoint data. This arrangement may enable an on-premise resource to transmit a request for an off-premise resource via the connectivity component so that the request is routed to the appropriate off-premise resource.

Also, in some embodiments, the second communication component may be adapted to receive a response to the communicated flow execution request, and the first communication component may be adapted to communicate the received response to the application. In this way, a response to a flow execution request may be communicated back to the application that originated the flow execution request. Proposed connectivity components may therefore provide for the management of communication between off-premise and on-premise platforms so that requests and responses are appropriately delivered whilst avoiding excessive communication traffic.

Embodiments may be employed in a switch module. For example, there may be provided a switch module comprising a connectivity component according to a proposed embodiment. Also, embodiments may be implemented in a server device. Such a server device may be a cloud-based server resource accessible via the Internet.

According to another aspect, there is provided a computer-implemented method of managing communication between off-premise and on-premise servers; the method comprising: storing, in an endpoint data store, endpoint data associated with one or more flows; receiving a flow execution request from an application of an off-premise server or an on-premise server; determining a requested flow based on the received flow execution request; identifying stored endpoint data associated with the requested flow; and communicating the flow execution request to an on-premise server or off-premise server based on the identified endpoint data.

The step of receiving a flow execution request may comprise establishing a secure tunnel for receiving the flow execution request, and the step of communicating the flow execution request may comprise establishing a secure tunnel for communicating the flow execution request.

Embodiments may comprise the steps of: receiving endpoint data from at least one of: an application of an off-premise server; an application of an on-premise server; an off-premise server module; and an on-premise server module; and storing received endpoint data in the endpoint data store.

Also, some embodiments may further comprise removing endpoint data from the endpoint data store in response to at least one of: an application; a server; and a flow becoming inaccessible.

Receiving a flow execution request may, for example, comprise receiving a flow execution request from an off-premise server. Further, communicating the flow execution request may comprise communicating the flow execution request to an on-premise server based on the identified endpoint data.

In some embodiments, receiving a flow execution request may comprise receiving a flow execution request from an on-premise server. Also, communicating the flow execution request may comprise communicating the flow execution request to an off-premise server based on the identified endpoint data.

Embodiments may further comprise: receiving a response to the communicated flow execution request; and communicating the received response to the application.

According to another embodiment of the present invention, there is provided a computer program product for managing communication between off-premise and on-premise servers, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

The processing system may be adapted to act as a switching component between an on-premise server and an off-premise server.

The processing system may be adapted to implement a part of an off-premise platform, such as a cloud-based system or server.

Thus, there may be proposed a system which evaluates a flow execution request and determines where to communicate the request based on stored data associated with flows. Taking such an approach may reduce processing and/or communication requirements by avoiding unnecessary data exchange between off-premise and on-premise platforms. For instance, it may avoid duplication of processing operations and/or help to improve processing performance by splitting flows and allocating them to either on-premise systems or off-premise systems (depending on their computational/resource requirements, for example).

BRIEF DESCRIPTION OF THE DRAWINGS

Preferred embodiments of the present invention will now be described, by way of example only, with reference to the following drawings, in which.

DETAILED DESCRIPTION

Figure 1A:
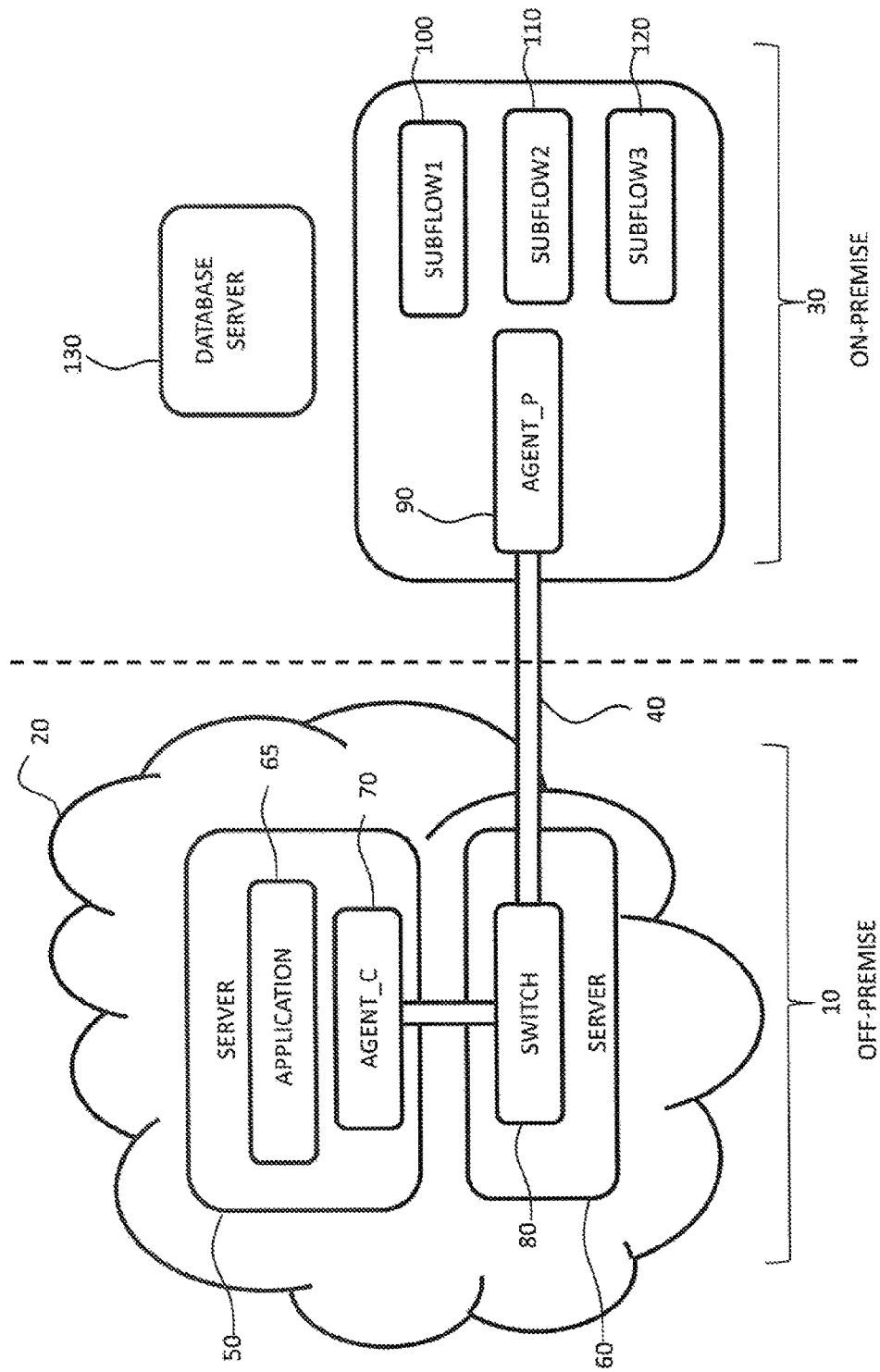
FIG. 1A is a simplified block diagram of an exemplary implementation of an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

A "flow" may be understood as being an ordered set of operations that starts at an input and ends in an output (or just ends with no output). Within such an ordered set of operations, branching and conditional execution of operations may happen. Thus, when employed for integration between off-premise and on-premise resources (such as may done in cloud-based provision of software to a user of an on-premise resource, or as part of a SaaS environment), one or more of the operations of a flow may interact with an external system, thus requiring communication between the off-premise and on-premise resources.

Proposed are concepts for establishing and/or managing communication between off-premise and on-premise platforms, wherein the data processing flows may be split or separated into flows which can run either in the off-premise environment or in the on-premise environment and wherein the flows may invoke each other and exchange data via a connectivity component (e.g. a switching module). A connectivity component may then be implemented to receive flow requests and forward such requests to the appropriate destination (e.g. endpoint), wherein the appropriate destination is determined based on a data store comprising information about the flows. By using stored data to analyze and forward flow requests, mapping of ports between the off-premise system and on-premise system may be avoided, thus reducing an amount of data exchange between the off-premise and on-premise systems.

Embodiments may therefore reduce network traffic and/or help to improve communication efficiency.

For instance, proposed concepts may enable an off-premise flow to be invoked by an on-premise flow, and/or vice versa. Flows that may benefit from being executed on the off-premise systems may therefore be run in off-premise servers, whereas with flows that may benefit from being executed on the on-premise systems (e.g. those requiring access to on-premise systems of record) may be run in on-premise servers.

Illustrative embodiments may therefore provide concepts for communicating between off-premise resources and on-premise resources. Dynamic distributed processing optimization may therefore be provided by proposed embodiments.

Modifications and additional steps to a traditional SaaS implementation may also be proposed which may enhance the value and utility of the proposed concepts.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention.

Also, those of ordinary skill in the art will appreciate that the hardware and/or architectures in the Figures may vary depending on the implementation. Further, the processes of the illustrative embodiments may be applied to multiprocessor/server systems, other than those illustrated, without departing from the scope of the proposed concepts.

Moreover, the system may take the form of any of a number of different processing devices including client computing devices, server computing devices, a tablet computer, laptop computer, telephone or other communication devices, personal digital assistants (PDAs), or the like. In some illustrative examples, an off-premise device and an on-premise device may comprise a portable computing device that is configured with flash memory to provide non-volatile memory for storing operating system files and/or user-generated data, for example. Thus, the system may essentially be any known or later-developed processing system without architectural limitation.

A proposed concept may enhance a cloud-based service provisioning system by reducing network traffic or making operations more efficient. Embodiments may enable flow execution requests to be analyzed and forwarded to appropriate destinations off-premise or on-premise so as to establish connectivity between off-premise and on-premise platforms. Such proposals can extend or improve the processing capabilities or efficiency of a cloud-based software delivery system.

Figure 1B:
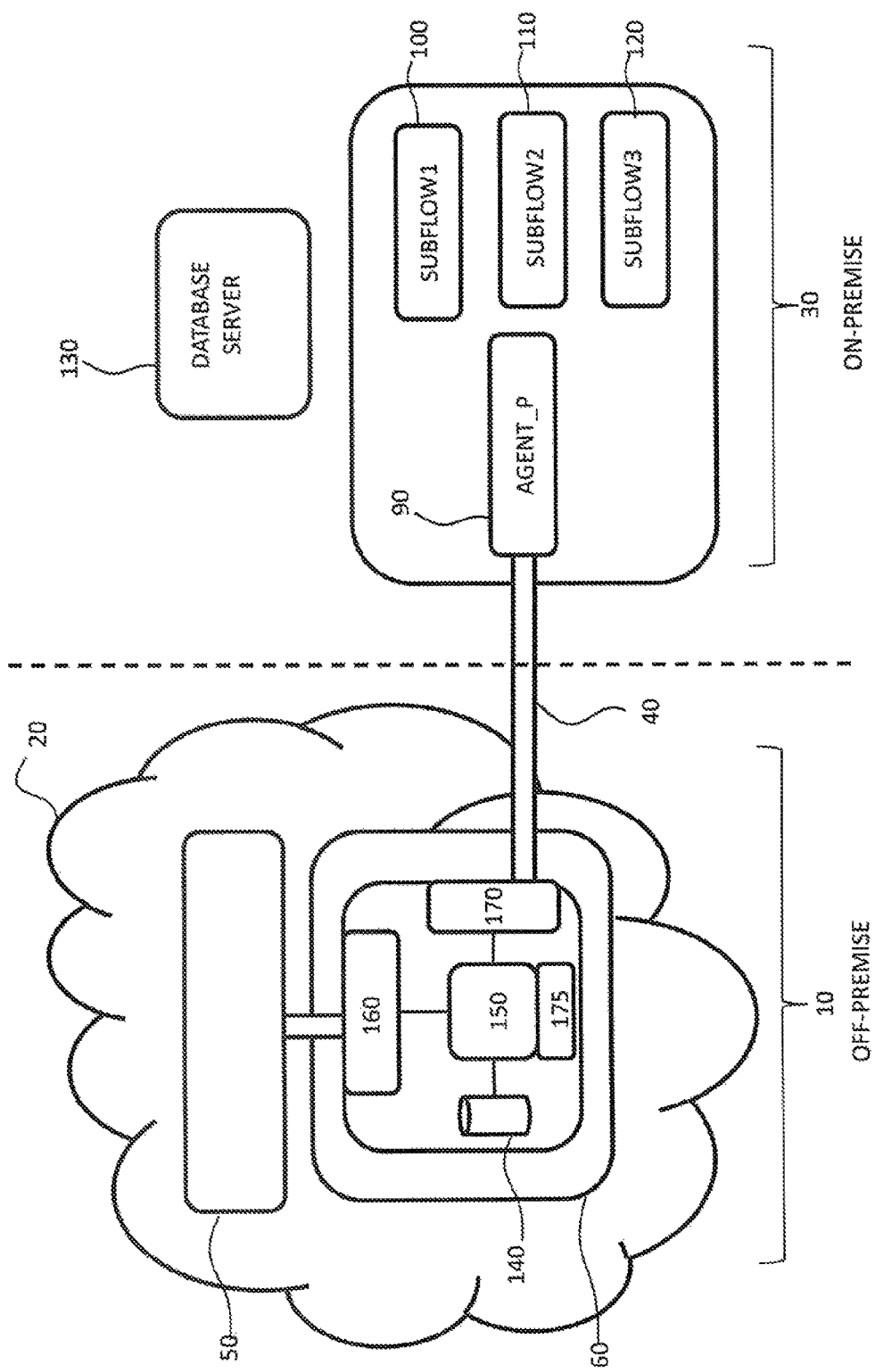
FIG. 1B is a modified version of FIG. 1A, wherein components of the switching component are illustrated.

Turning now to FIGS. 1A & 1B, an exemplary implementation of an embodiment will now be described. Here, a cloud-based software delivery service comprises off-premise resources 10 in the cloud 20 which are accessible to on-premise resources 30 via an Internet communication link 40.

The off-premise resources 10 comprise first 50 and second 60 off-premise servers. The first off-premise server 50 is a cloud-based server 50 and comprises an application 65 and a first server module/agent 70 (labeled "AGENT_C"). The second off-premise server 60 is a cloud-based server 60 and comprises a switching component (i.e. connectivity component) 80 adapted to manage communication between the first off-premise server 50 and the on-premise resources 30.

The on-premise resources 30 comprise a local module/agent 90 ("AGENT_P"), first 100 ("SUBFLOW1") to third 120 ("SUBFLOW3") flows, and a database server 130.

Referring now to FIG. 1B, wherein the switching component 80 is shown in more detail, the switching component 80 comprises: a data store 140; a routing component 150; a first communication component 160; and a second communication component 170.

The data store 140 comprises an endpoint data store adapted to store endpoint data associated with flows that are implemented by the on-premise resources 30. By way of example, the endpoint data may comprise information relating to flow names, server identifications, server addresses, flow version identifiers, and checksum information. The endpoint data may be provided to the data store 140 by servers or applications when they are made available by the on-premise resources 30. For this purpose, the switching component 80 comprises a registration module 175 that is adapted to receive end-point data from at least one of: an application of an off-premise server; an application of an on-premise server; an off-premise server module; and an on-premise server module. The registration module 175 may be adapted to store received endpoint data in the endpoint data store 140, thus enabling the concept of registering information with the switching component 80 so that it may identify how to handle (e.g. where to communicate) a request. Also, the registration module 175 may be adapted to remove information from the endpoint data store 140 in response to an application, a server, and/or a flow becoming inaccessible (e.g. being disconnected, terminated, or powered-down). A registering endpoint may therefore register information to identify a flow that it provides. This registered information can then be used to match a call/request for a flow to a system running the required flow.

Put another way, the data store 140 may be adapted to be dynamically updated or maintained in order to reflect changes in available flows or resource The data store 140 may therefore be thought of as providing a dynamically updated store of endpoint information representing data flows that may be accessible. In this way, the switching component 80 may adapt to implementation specifics and cater for changes in available resources (e.g. applications, service and/or flows), for example for the registration/deregistration of endpoint data to/from the data store 140.

The first communication component 160 is adapted to receive a flow execution request from the application 65 of the first off-premise server 50 (via the first server module/agent 70). For this purpose, the first communication component 160 is adapted to establish a secure tunnel for receiving the flow execution request.

A flow execution request is a request to execute or invoke a flow provided by the on-premise resources 30. By of example, a flow execution request of this embodiment comprises an identification portion and a payload portion, wherein the identification portion includes information relating to the identification of a flow (such as a flow name for example), and wherein the payload portion comprises a data payload (such as data for use in/by the flow for example).

Upon receiving a flow execution request, the first communication component 160 passes the received request to the routing component 150. The routing component 150 is adapted to process the received request in conjunction with data stored in the data store 140 in order to determine a requested flow and stored endpoint data associated with the requested flow. By way of example, the routing component 150 is adapted to analyze the identification portion of the received flow execution request to identify the requested flow (for example, based on a flow name included in the identification portion). Further, based on the identified requested flow, the routing component 150 is then adapted to query the data store 140 to identify endpoint data that is associated with the identified requested flow.

The routing component 150 passes the received flow execution request to the second communication component 170 along with the identified endpoint data associated with the identified requested flow. The second communication component 170 is adapted to communicate the received flow execution request to the on-premise resources 30 based on the identified endpoint data associated with the identified requested flow. For this purpose, the second communication component 170 is adapted to establish a secure tunnel for communicating the flow execution request. For example, the second communication component 170 may establish a mutually authenticated TLS tunnel connection between the switching component 60 and the local module/agent 90.

Thus, from the description above, the switching component 60 may be thought of as having first and second secure components for establishing tunnels with off-premise and on-premise server modules, respectively. The switching component 60 may also be thought of as including a registration component that is adapted to register and store (in a data store of the switching component 60) endpoint data (e.g., flow names, server IDs, server addresses, flow version identifiers, and checksum information) associated with flows. Applications or servers may therefore register information with the switching component 60 when they connect and/all when a configuration changes. Such information may also be deregistered (e.g. removed or deleted from the data store) when an application or server becomes inaccessible (e.g. is disconnected, powered down or otherwise unavailable). Received calls (e.g. requests) to execute a flow may thus be analyzed by the switching component 60 and be used to query the dynamically maintained data store to identify endpoint data indicative of where to communicate the call.

The switching component 60 may therefore enable a cloud application to call a flow of an on-premise server, wherein the call is handled and communicated to the appropriate on-premise server by the switching component 60. Conversely, the switching component 60 may enable an on-premise flow to call a flow of an off-premise server.

By way of example, and with reference to FIG. 2, an example of a cloud-based application 65 of the first server 50 calling the first sub flow 100 "SUBFLOW1" (which accesses an on-premise database server 130) will now be described.

Firstly, as indicated by the arrow labeled "A", the application 65 of the first server 50 communicates a flow execution request to the switching component 80 via the first server module/agent 70 (labeled "AGENT_C"). This communication is established using a secure tunnel between the first server module/agent 70 (labeled "AGENT_C") and the first communication component 160 of the switching component 80. The flow execution request in this example comprises: an identification portion including the name of the first sub flow 100, namely SUBFLOW1; and a data payload comprising data to be stored in the database server 130.

Next, as indicated by the label "B", the switching component 80 determines the requested flow from the identification portion of the flow execution request, and subsequently queries the data store 140 of the switching component 80 to determine endpoint data associated with the requested flow (SUBFLOW1).

Based on the determined endpoint data, the second communication component 170 then communicates the flow execution request to the first flow 100 ("SUBFLOW1") of the on-premise resources 30 as indicated by the arrows labeled "C" and "D". This communication is established using a secure tunnel between the second communication component 170 and the local module/agent 90 ("AGENT_P").

Finally, as indicated by the label "E", the first flow 100 executes and accesses the database server 130 to store the data of the data payload (of the flow execution request).

Thus, from the above example, it will be seen that the switching component 80, the first server module/agent 70 (labeled "AGENT_C"), and the local module/agent 90 ("AGENT_P") manage mutually authenticated TLS connections. In this diagram, the first flow 100 accesses an on-premise database server 130 and the credentials required to access the database server 130 need only be known to the on-premise resources (and not the off-premise servers).

Figure 2:
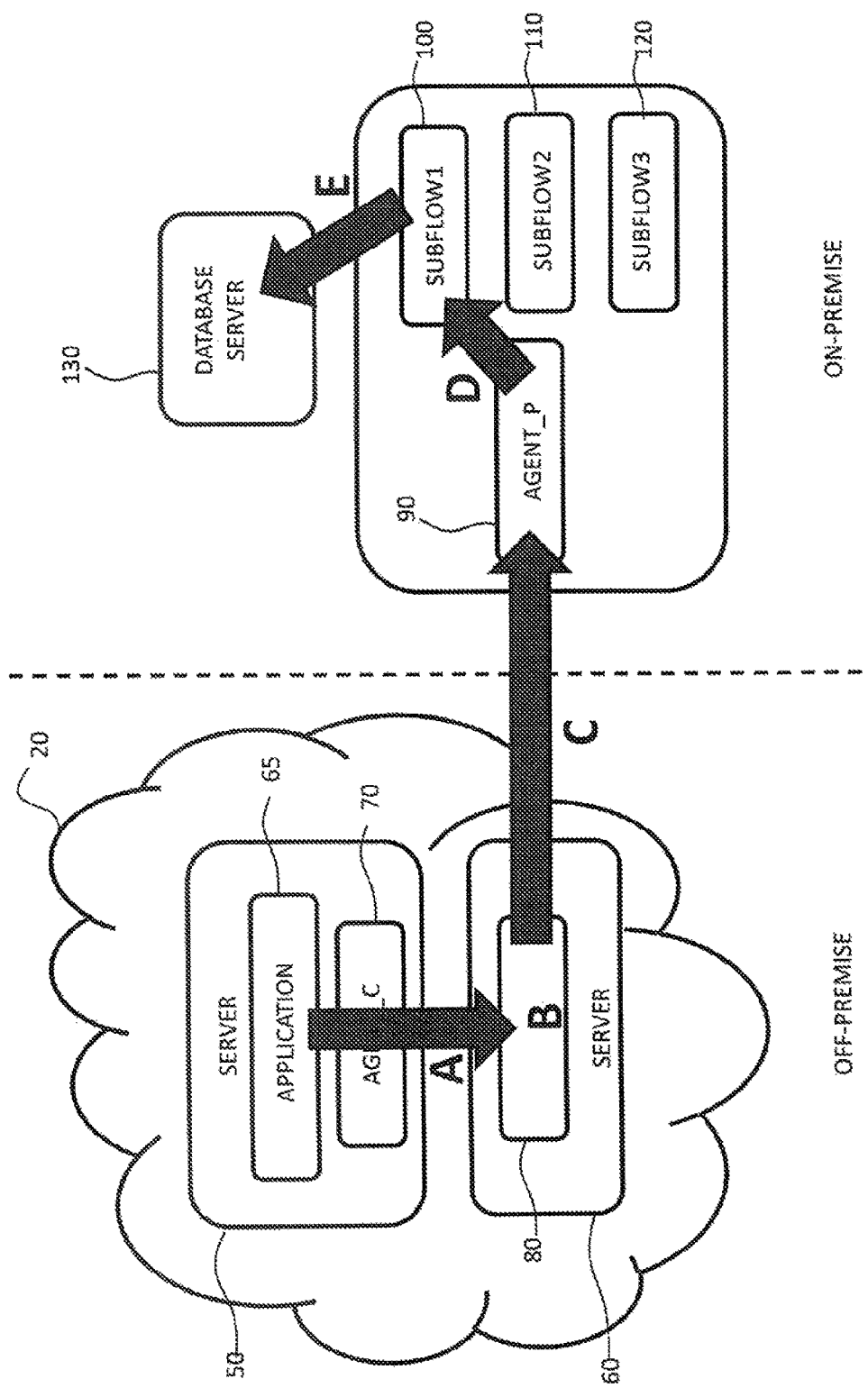
FIG. 2 depicts an example of the embodiment of FIG. 1 wherein a cloud-based application of the first server calls the first sub flow.

Also, in the above example of FIG. 2, the first communication component 160 is adapted to receive a flow execution request from the off-premise server 50, and the second communication component 170 is adapted to communicate the flow execution request to an on-premise resource (such as the local agent 90). In this way, requests may be received from off-premise (e.g. cloud-based) resources and routed by the switching component 80 to the appropriate on-premise resource(s).

However, it is to be understood that, in other embodiments, requests may be received from on-premise resources and routed by the switching component 80 to the appropriate off-premise (e.g. cloud-based) resource(s). For example, the second communication component 170 may be adapted to receive a flow execution request from an on-premise resource/server, and the first communication component 160 may be adapted to communicate the flow execution request to an off-premise server. Such an arrangement may enable an on-premise resource to request/call an off-premise resource via the switching component 80, wherein the routing of the request/call is handled by the switching component.

Further, embodiments may also be adapted to enable the communication of a response from the requested/called flow back to the calling application. By way of illustration, in the example depicted in FIG. 2, the second communication component 170 may be adapted to receive a response to the communicated flow execution request. The routing component 150 may then determine intended destination of the response (e.g. based on analysis of the response and/or stored data relating to previously communicated requests) and then pass the response to the first communication component 160 for communication to the application that originated the request (to which the response is responding).

In this way, a response to a request/call may be communicated back to the application (or resource) that originated the request/call. Proposed embodiments may therefore provide for the management of communication between off-premise and on-premise platforms so that requests and responses are appropriately delivered whilst avoiding excessive communication traffic.

As has been detailed above, routing of flow execution requests may be implemented based on a data store (e.g. a database or lookup table) comprising endpoint information associated with flows. The data store may be dynamically or automatically maintained so as to comprise up-to-date endpoint data depending on available flows or resources. By way of example, the data store may comprise information relating to flow names, server identifications, server addresses, flow version identifiers, and checksum information. Such endpoint data may be provided to the data store by servers or applications using a registration process which thus enables the concept of updating/maintaining the data store in dynamic or automatic manner.

Figure 3A:
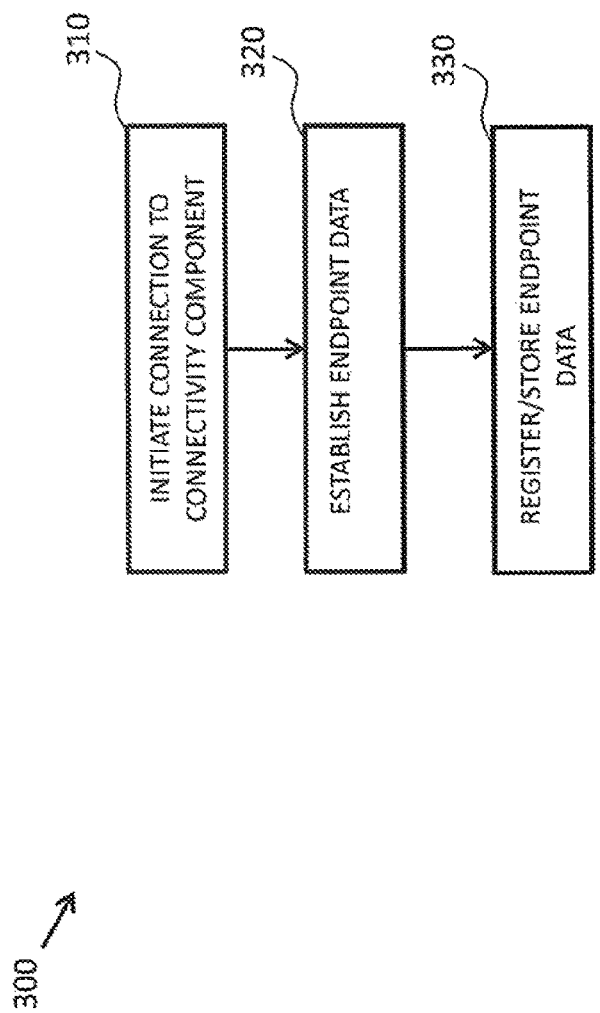
FIG. 3A depicts a flow diagram of an endpoint data registration method according to an embodiment.

Referring now to FIG. 3A, there is depicted a flow diagram of an endpoint data registration method 300 that may be employed by an embodiment. Here the method is described as being implemented by a registration module of a connectivity component (e.g. switching module) according to a proposed embodiment.

The method 300 begins in step 310 wherein a connection to the connectivity component is initiated by an off-premise or on premise resource (such as a server module for example). By way of example, the off-premise or on-premise resource may set up a mutually authenticated TLS connection with a communication component/interface of the connectivity component.

Next, in step 320, the endpoint data associated with at least one flow is established. This may be done, for example, by simply receiving endpoint information of a flow from the resource that established the connection to the connectivity component. In this way, a server or application may directly provide endpoint data for registration or storage by the connectivity component. Alternatively, endpoint data may be obtained by querying the resource and thus actively seeking endpoint information of a flow (rather than simply automatically receiving such information in a passive manner). By way of example, endpoint data may be extracted or determined through analysis of the established connection.

Finally, in step 330, the established endpoint data associated with this at least one flow is a registered/stored in a data store of the connectivity component. Storage of such endpoint data may be done in a structured manner using a relational database or table, for example.

Repeated execution of such an endpoint data registration method 300 may therefore enable a data store to be built and maintained as and when new resources or flows are made available via connection to the connectivity component.

Figure 3B:
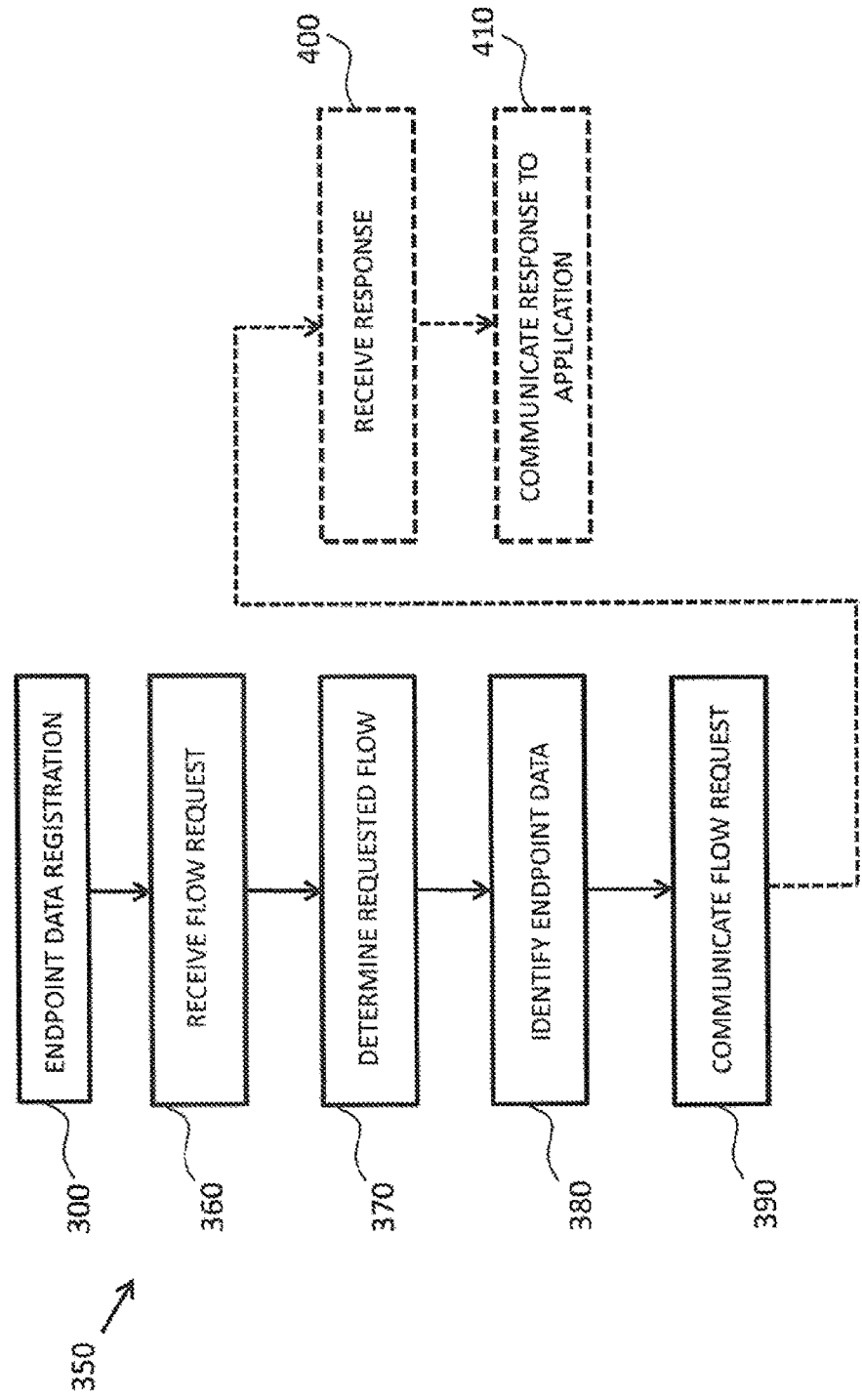
FIG. 3B depicts a flow diagram of a method for managing communication between off-premise and on-premise resources according to an embodiment.

Referring now to FIG. 3B, there is depicted a flow diagram of a method for managing communication between off-premise and on-premise resources according to an embodiment. As with the method of FIG. 3A, the method is described as being implemented by a connectivity component (e.g. switching module) according to a proposed embodiment.

The method begins with the step 300 of endpoint data registration (as described with reference to FIG. 3A). In other words, the method initially implements that endpoint data registration method depicted in FIG. 3A, so that endpoint data associated with available flows is stored in a datastore of the connectivity component. Once the endpoint data registration process 300 is completed, and thus the datastore is appropriately populated, the method proceeds to step 360.

In step 360, a flow execution request is received by the connectivity component from an application of an off-premise server or an on-premise server. Here, the flow execution request is received via a (previously) established secure tunnel. Also, the flow execution request of this example comprises a request to execute or invoke a flow and consists of a header or identification portion and a payload portion. The header/identification portion includes information relating to the identification of the requested flow (such as a flow name for example), and the payload portion comprises a data payload (such as data for use in/by the flow for example).

Next, in step 370, the received flow execution request is processed in conjunction with data stored in the data store in order to determine a requested flow. For example, the connectivity component analyzes the identification portion of the received flow execution request to identify the requested flow (for example, based on a flow name included in the identification portion). The method then proceeds to step 380, wherein based on the identified requested flow, the connectivity component queries the data store to identify endpoint data that is associated with the identified requested flow. In other words, based on the identified requested flow, the connectivity component searches the data store to find a data entry/record for the requested flow and then extracts endpoint data that is stored in the data entry/record for the requested flow.

In step 390, the connectivity component then communicates the flow execution request to an off-premise or on-premise resource based on the identified endpoint data. For this purpose, an established secure tunnel is used to communicate the flow execution request.

Thus, from the above description of the method of FIG. 3B, it will be appreciated that a method of receiving a flow execution request and communicating (e.g. forwarding) the request to an appropriate endpoint (e.g. application or server module) may be provided. It should also be appreciated that the flow execution request, may or may not require a response to be provided (for example, back to the originator of the request).

In the case that a response is to be provided, the method 350 comprises additional steps 400 and 410. Step 400 comprises receiving, at the connectivity component and via the same secure tunnel used to communicate the flow execution request, a response to the flow execution request. Then, in step 410, the connectivity component routes the response to the appropriate direction, for example the originator of the flow execution request. For this purpose, the connectivity component may use the data store, or another collection of information, to determine where to route the response. For instance, the connectivity component may be adapted to maintain a record of communicated flow execution requests, along with destination or originator information. Such recorded information may then be analyzed in order to determine where to communicate a received response.

As detailed above, the data store of the connectivity component may be dynamically or automatically maintained using a registration/deregistration process so as to reflect changes in available flows or resources. Thus, in addition to implementing the endpoint data registration method 300 of FIG. 3A, an endpoint data de-registration method may be employed. Such a de-registration process may be executed in response to changes in connectivity for example. These changes may be signaled by the removal of resources or communication links, and/or may be indicated by signal or request indicating that a resource is to become unavailable/inaccessible. Endpoint data may therefore be removed from the data store by using a deregistration process which thus enables the concept of updating/maintaining the data store in dynamic or automatic manner.

Figure 3C:
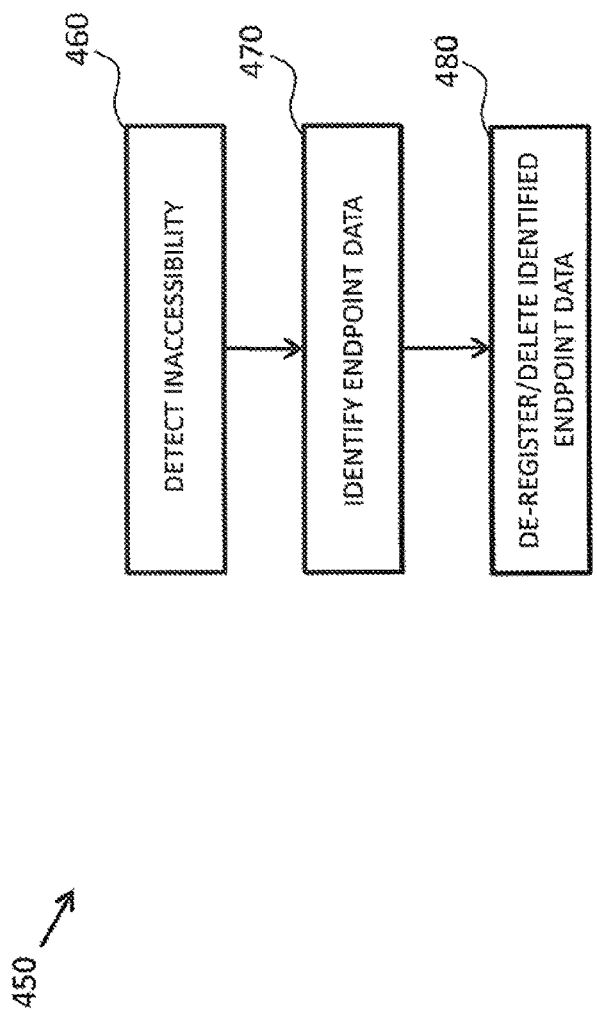
FIG. 3C depicts a flow diagram of an endpoint data deregistration method according to an embodiment.

Referring now to FIG. 3C, there is depicted a flow diagram of an endpoint data deregistration method 450 that may be employed by an embodiment. Here the method is described as being implemented by a registration module of a connectivity component (e.g. switching module) according to a proposed embodiment.

The method 450 begins in step 460 wherein inaccessibility of an off-premise or on-premise resource (such as a flow, server, server module or secure tunnel for example) is detected. By way of example, the off-premise or on-premise resource may set up to communicate a signal to the connectivity component shortly before it becomes inaccessible. Detection of such a signal may then be used to detect pending or imminent inaccessibility of an off-premise or on-premise resource. Alternatively, or additionally, inaccessibility may be detected by detecting the loss of a secure tunnel connection, for example due to a server being disconnected, terminated, or powered-down.

Next, in step 470, the endpoint data associated with the inaccessible off-premise or on-premise resource is identified. This may be done, for example, by simply receiving information from the resource prior to it becoming inaccessible. In this way, a server or application may directly provide endpoint data for deregistration or deletion by the connectivity component. Alternatively, endpoint data may identified for deregistration or removal from the data store by querying the data store and thus actively updating endpoint information in the data store. By way of example, endpoint data may be identified or determined through analysis of the lost connection in conjunction with the data store.

Finally, in step 480, the identified endpoint data associated with the inaccessible off-premise or on-premise resource is deregistered/removed from the data store of the connectivity component.

Repeated execution of such an endpoint data deregistration method 450 may therefore enable a data store to be maintained and updated as and when resources or flows become unavailable to the connectivity component.

It will therefore be understood that embodiments may be adapted to add and remove information from the endpoint data store in response to status changes in an application, a server, and/or a flow of off-premise and on-premise resources. Put another way, embodiments may dynamically update or maintain any structured data resource In order to reflect changes in available flows.

It will be appreciated that embodiments, such as that presented above with reference to their figures may provide the benefit of reducing the amount of data that passes between data flows in off-premise and on-premise platforms. This may be done in two ways:
i: the developer has the ability to pass only what is required in order to invoke a flow; and
ii: the format of the data that gets crossed across the secure tunnel is compressed to a binary format will such as Efficient XML Interchange (EXI), protocol buffers, or a similar scheme.

It is also noted that embodiments may enable an off-premise flow to not need any secure information (e.g. database user credentials, ports, IP addresses, etc.).

Through program flow analysis, embodiments may enable a better understanding of application requirements and will therefore avoid propagation of multiple data formats simultaneously, which will in turn reduce associated memory requirements.

As will be apparent from the above description, an off-premise resource may be provided by a cloud-computing system. Also, a connectivity component or method for managing communication between off-premise and on-premise platforms may be provided or implemented by a cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics are as follows:

On-demand self-service: a cloud consumer can unilaterally provide computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
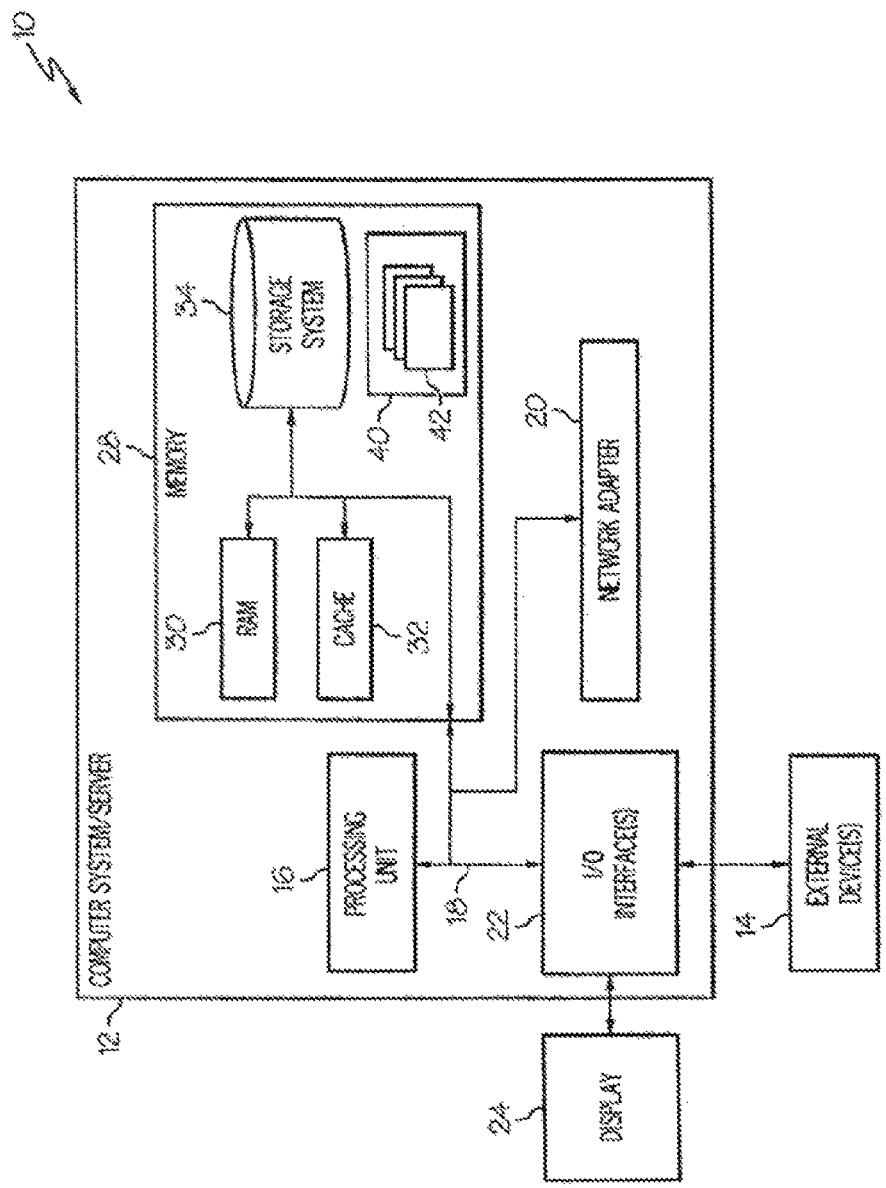
FIG. 4 illustrates a cloud system node.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
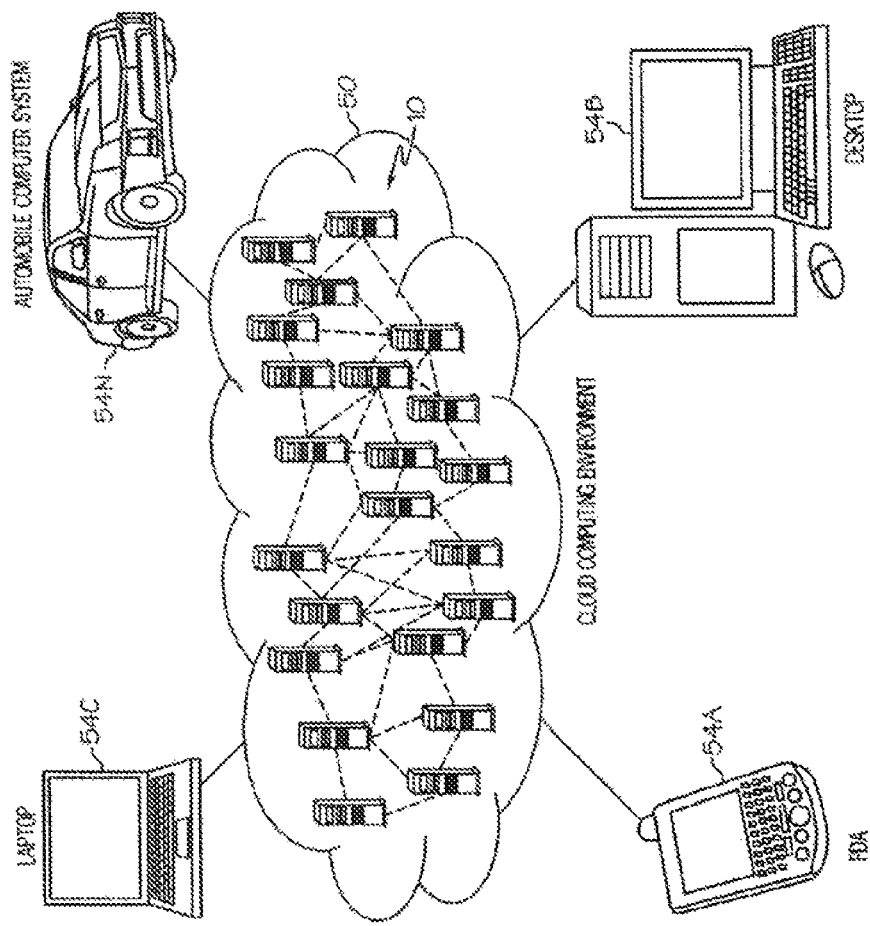
FIG. 5 illustrates a cloud computing environment according to an embodiment.

Referring now to FIG. 5, illustrative cloud computing environment or cloud computing system 50 is depicted. This can, in embodiments, be equated to the cloud computing system as depicted in FIG. 2. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
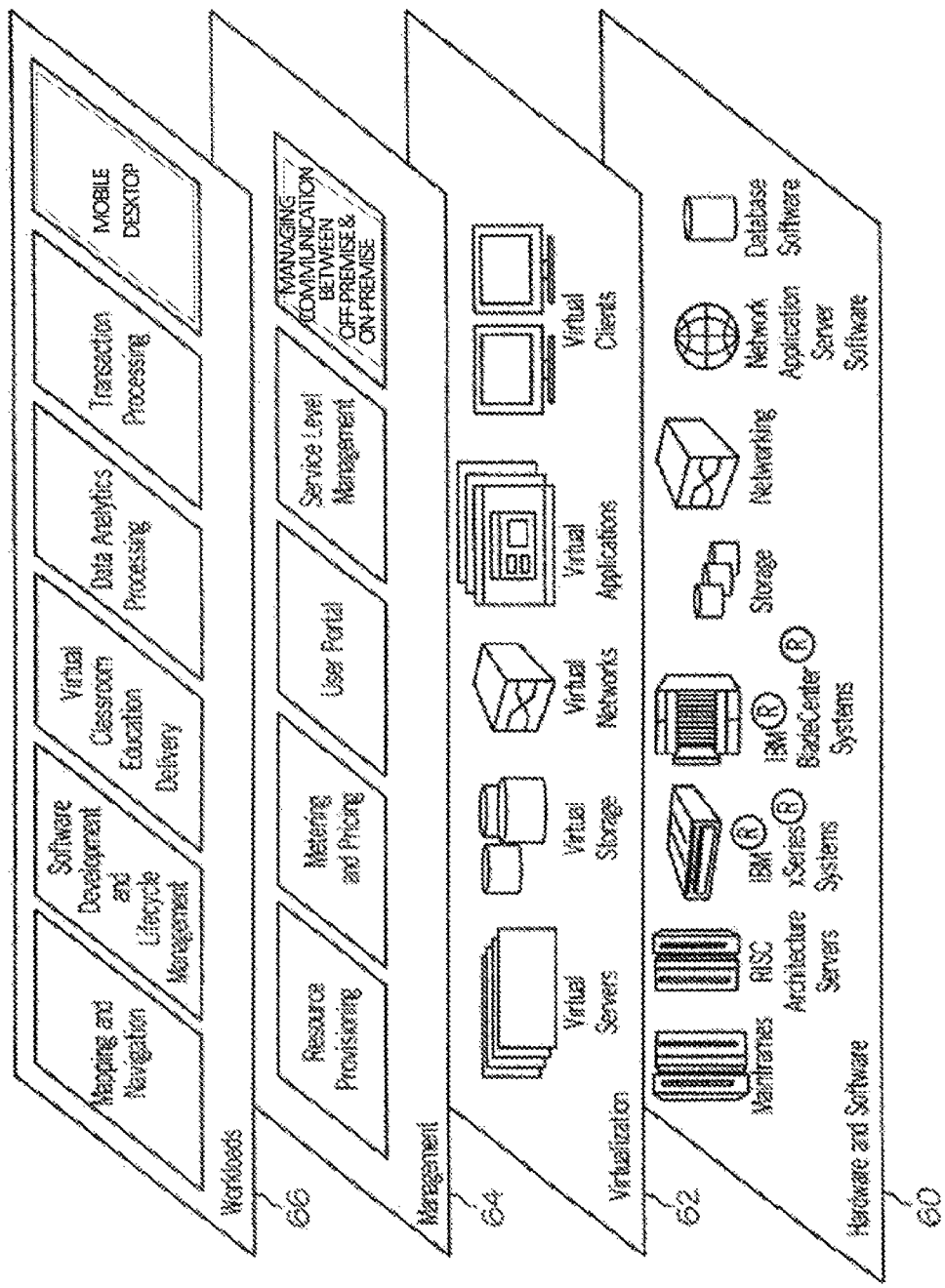
FIG. 6 illustrates cloud abstraction mode layers according to an embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Managing communication between off-premise and on-premise platforms provides for calling or requesting request of flows between off-premise and on-premise resources, according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A connectivity component adapted to manage communication between an off-premise server at an off-premise location and an on-premise server at an on-premise location, the connectivity component residing at the off-premise location and comprising:
   an endpoint data store of the connectivity component, the endpoint data store adapted to store endpoint data associated with one or more flows;
   a first communication component of the connectivity component, the first communication component adapted to receive a flow execution request from an application of an off-premise server or an on-premise server;
   a routing component of the connectivity component, the routing component adapted to determine a requested flow based on the received flow execution request and to identify stored endpoint data associated with the requested flow; and
   a second communication component of the connectivity component, the second communication component adapted to communicate the flow execution request to an on-premise server or off-premise server based on the identified endpoint data.

2. The connectivity component of claim 1, wherein the first communication component is adapted to establish a first secure tunnel between the first communication component and a server hosting the application for receiving the flow execution request; and wherein the second communication component is adapted to establish a second secure tunnel, different from the first secure tunnel, between the second communication component and an agent of the on-premise server or off-premise server for communicating the flow execution request.

3. The connectivity component of claim 1, wherein the off-premise server further comprises a cloud server; and wherein the application is provided as a service of the cloud server.

4. The connectivity component of claim 1, further comprising:
   a registration module of the connectivity component, the registration module adapted to receive end-point data from at least one selected from the group consisting of an application of an off-premise server, an application of an on-premise server, an off-premise server module, and an on-premise server module; and
   wherein the registration module is adapted to store received endpoint data in the endpoint data store.

5. The connectivity component of claim 4, wherein the registration module is adapted to remove endpoint data from the endpoint data store in response to at least one selected from the group consisting of an application, a server, and a flow becoming inaccessible.

6. The connectivity component of claim 4, wherein the endpoint data further comprises at least one selected from the group consisting of a flow name, a server identification, a server address, a flow version identifier, and checksum information.

7. The connectivity component of claim 1, wherein the flow execution request further comprises at least one selected from the group consisting of a flow name, a data payload, and entry point data.

8. The connectivity component of claim 1, wherein the first communication component is adapted to receive the flow execution request from the off-premise server; and wherein the second communication component is adapted to communicate the flow execution request to the on-premise server based on the identified endpoint data.

9. The connectivity component of claim 1, wherein the first communication component is adapted to receive the flow execution request from the on-premise server; and wherein the second communication component is adapted to communicate the flow execution request to the off-premise server based on the identified endpoint data.

10. The connectivity component of claim 1, wherein the second communication component is adapted to receive a response to the communicated flow execution request; and wherein the first communication component is adapted to communicate the received response to the application.

11. The connectivity component of claim 1, further comprising a switch module.

12. A computer-implemented method of managing communication between an off-premise server at an off-premise location and an on-premise server at an on-premise location, the method comprising:
   storing, in an endpoint data store, by a connectivity component residing at the off-premise location, endpoint data associated with one or more flows;
   receiving, by the connectivity component residing at the off-premise location, a flow execution request from an application of an off-premise server or an on-premise server;
   determining, by the connectivity component residing at the off-premise location, a requested flow based on the received flow execution request;
   identifying, by the connectivity component residing at the off-premise location, stored endpoint data associated with the requested flow; and
   communicating, by the connectivity component residing at the off-premise location, the flow execution request to an on-premise server or off-premise server based on the identified endpoint data.

13. The computer-implemented method of claim 12, wherein the receiving the flow execution request further comprises:
   establishing a first secure tunnel between a first communication component of the connectivity component and a server hosting the application, the first communication component performing the receiving the flow execution request, and the first secure tunnel for receiving the flow execution request; and
   wherein the communicating the flow execution request further comprises establishing a second secure tunnel, different from the first secure tunnel, between a second communication component of the connectivity component and an agent of the on-premise or off-premise server, and the second secure tunnel for communicating the flow execution request.

14. The computer-implemented method of claim 12, further comprising:
   receiving, by a registration module of the connectivity component, end-point data from at least one selected from the group consisting of an application of an off-premise server, an application of an on-premise server, an off-premise server module, and an on-premise server module; and
   storing, by the registration module, received endpoint data in the endpoint data store.

15. The method of claim 14, further comprising removing, by the registration module, endpoint data from the endpoint data store in response to at least one selected from the group consisting of an application, a server, and a flow becoming inaccessible.

16. The computer-implemented method of claim 12, wherein the receiving the flow execution request further comprises:
   receiving the flow execution request from the off-premise server; and
   wherein the communicating the flow execution request further comprises communicating the flow execution request to the on-premise server based on the identified endpoint data.

17. The computer-implemented method of claim 12, wherein receiving the flow execution request further comprises:
   receiving the flow execution request from the on-premise server; and
   wherein the communicating the flow execution request further comprises communicating the flow execution request to the off-premise server based on the identified endpoint data.

18. The computer-implemented method of claim 12, further comprising:
   receiving, by a second communication component of the connectivity component, a response to the communicated flow execution request; and
   communicating, by the second communication component, the received response to the application.

19. A computer program product for managing communication between an off-premise server at an off-premise location and an on-premise server at an on-premise location, the computer program product comprising a computer readable storage medium having program instructions embodied therewith, the program instructions executable by a processing unit to cause the processing unit to perform a method comprising:
- storing, in an endpoint data store, by a connectivity component residing at the off-premise location, endpoint data associated with one or more flows;
- receiving, by the connectivity component residing at the off-premise location, a flow execution request from an application of an off-premise server or an on-premise server;
- determining, by the connectivity component residing at the off-premise location, a requested flow based on the received flow execution request;
- identifying, by the connectivity component residing at the off-premise location, stored endpoint data associated with the requested flow; and
- communicating, by the connectivity component residing at the off-premise location, the flow execution request to an on-premise server or off-premise server based on the identified endpoint data.

20. The computer program product of claim 19, wherein the receiving the flow execution request further comprises:
- establishing a first secure tunnel between a first communication component of the connectivity component and a server hosting the application, the first communication component performing the receiving the flow execution request, and the first secure tunnel for receiving the flow execution request; and
- wherein the communicating the flow execution request further comprises establishing a second secure tunnel, different from the first secure tunnel, between a second communication component of the connectivity component and an agent of the on-premise or off-premise server, and the second secure tunnel for communicating the flow execution request.

* * * * *